(12) United States Patent
Golla et al.

(10) Patent No.: US 10,474,601 B2
(45) Date of Patent: Nov. 12, 2019

(54) DISTRIBUTED FAIRNESS PROTOCOL FOR INTERCONNECT NETWORKS

(71) Applicant: Oracle International Corporation, Redwood City, CA (US)

(72) Inventors: Robert Golla, Austin, TX (US); Manish Shah, Austin, TX (US); Mark Luttrell, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 265 days.

(21) Appl. No.: 15/425,025

(22) Filed: Feb. 6, 2017

(65) Prior Publication Data
US 2018/0225239 A1    Aug. 9, 2018

(51) Int. Cl.
*G06F 13/36* (2006.01)
*G06F 13/24* (2006.01)
*G06F 13/40* (2006.01)

(52) U.S. Cl.
CPC .............. *G06F 13/36* (2013.01); *G06F 13/24* (2013.01); *G06F 13/4068* (2013.01)

(58) Field of Classification Search
CPC ....... G06F 13/24; G06F 13/36; G06F 13/4068
See application file for complete search history.

(56) References Cited

U.S. PATENT DOCUMENTS

| | | | |
|---|---|---|---|
| 5,560,027 A | 9/1996 | Watson | |
| 5,659,796 A | 8/1997 | Thorson | |
| 5,701,416 A | 12/1997 | Thorson | |
| 5,887,146 A | 3/1999 | Baxter | |
| 2003/0033394 A1* | 2/2003 | Stine | H04L 45/02 709/222 |
| 2008/0151909 A1 | 6/2008 | Scott | |
| 2008/0225737 A1* | 9/2008 | Gong | H04L 47/824 370/252 |
| 2016/0261377 A1* | 9/2016 | Chan | H04L 1/1874 |
| 2017/0245177 A1* | 8/2017 | Yadav | H04W 28/0284 |

* cited by examiner

*Primary Examiner* — Eric T Oberly
(74) *Attorney, Agent, or Firm* — Meyertons, Hood, Kivlin, Kowert & Goetzel, P.C.

(57) ABSTRACT

A system is disclosed, including a plurality of access units, a plurality of circuit nodes each coupled to a respective access unit, and a plurality of data processing nodes each coupled to a respective access unit. A particular data processing node may be configured to generate a plurality of data transactions. The particular data processing node may also be configured to determine an availability of a coupled access unit. In response to a determination that the coupled access unit is unavailable, the particular data processing node may be configured to halt a transfer of the plurality of data transactions to the coupled access unit and assert a halt indicator signal. In response to a determination that the coupled access unit is available, the particular data processing node may be configured to transfer the particular data transaction to the coupled access unit.

24 Claims, 10 Drawing Sheets

DISTRIBUTED FAIRNESS PROTOCOL FOR INTERCONNECT NETWORKS

BACKGROUND

Technical Field

The embodiments disclosed within relate to computing systems, and more particularly, to the operation of a communication network in a processing system.

Description of the Related Art

Communication networks may be used with a variety of computing systems including cellular telephones, personal computers, servers, and distributed computing systems. Networks may provide communication between computing system nodes, between nodes within a given computing system, or even between various circuit nodes within a given computer chip, such as a processor chip. Various nodes may generate data and or commands to be sent to other nodes in a system. In some cases multiple source nodes may generate data to be sent to a common group of one or more destination nodes. In some embodiments, transfer of data from data source nodes to destination nodes receiving the data may occur over a system bus that carries a wide variety data from many source nodes to many destination nodes. In other embodiments, to off-load the system bus, transfer of data between nodes may occur over a communication network coupled to a group of source nodes that communicate with a common group of destination nodes.

SUMMARY

Various embodiments of an apparatus and a method for implementing and managing a communication link are disclosed. Broadly speaking, a system is contemplated in which the system may include a plurality of access units arranged in series, a plurality of circuit nodes each coupled to a respective one of the plurality of access units, and a plurality of data processing nodes each coupled to a respective access unit of the plurality of access units. A particular access unit of the plurality of access units may be configured to transfer a data transaction to an coupled access unit of the plurality of access units in response to a transfer signal. A particular data processing node may be configured to generate a plurality of data transactions. A destination of a particular data transaction of the plurality of data transactions may be a particular circuit node of the plurality of circuit nodes. The particular data processing node may also be configured to determine an availability of the respective access unit coupled to the particular data processing node. In response to a determination that the respective access unit is unavailable, the particular data processing node may be configured to halt a transfer of the plurality of data transactions to the respective access unit and assert a halt indicator signal. In response to a determination that the respective access unit is available, the particular data processing node may be configured to transfer the particular data transaction to the respective access unit.

In a further embodiment, the particular data processing node may be further configured to increment at least one count value in response to the determination that the respective access unit is unavailable. In an embodiment, the particular circuit node may be configured to retrieve the particular data transaction in response to a determination that the destination of the particular data transaction corresponds to an identification value of the particular circuit node.

In another embodiment, the particular data processing node may be further configured to decrement at least one count value, in response to detecting an asserted halt indicator signal from an adjacent data processing node of the plurality of data processing nodes. In a further embodiment, the particular data processing node may be further configured to halt the transfer of the plurality of data transactions in response to a determination that the at least one count value satisfies a threshold value.

In one embodiment, the particular data processing node includes a queue, and wherein to transfer the particular data transaction to the respective access unit, the particular data processing node may be further configured to store the particular data transaction in the queue. In another embodiment, in response to the particular data processing node halting the transfer of the plurality of data transactions to the respective access unit, the respective access unit may be configured to continue to transfer a data transaction to an adjacent access unit.

Figure 1:
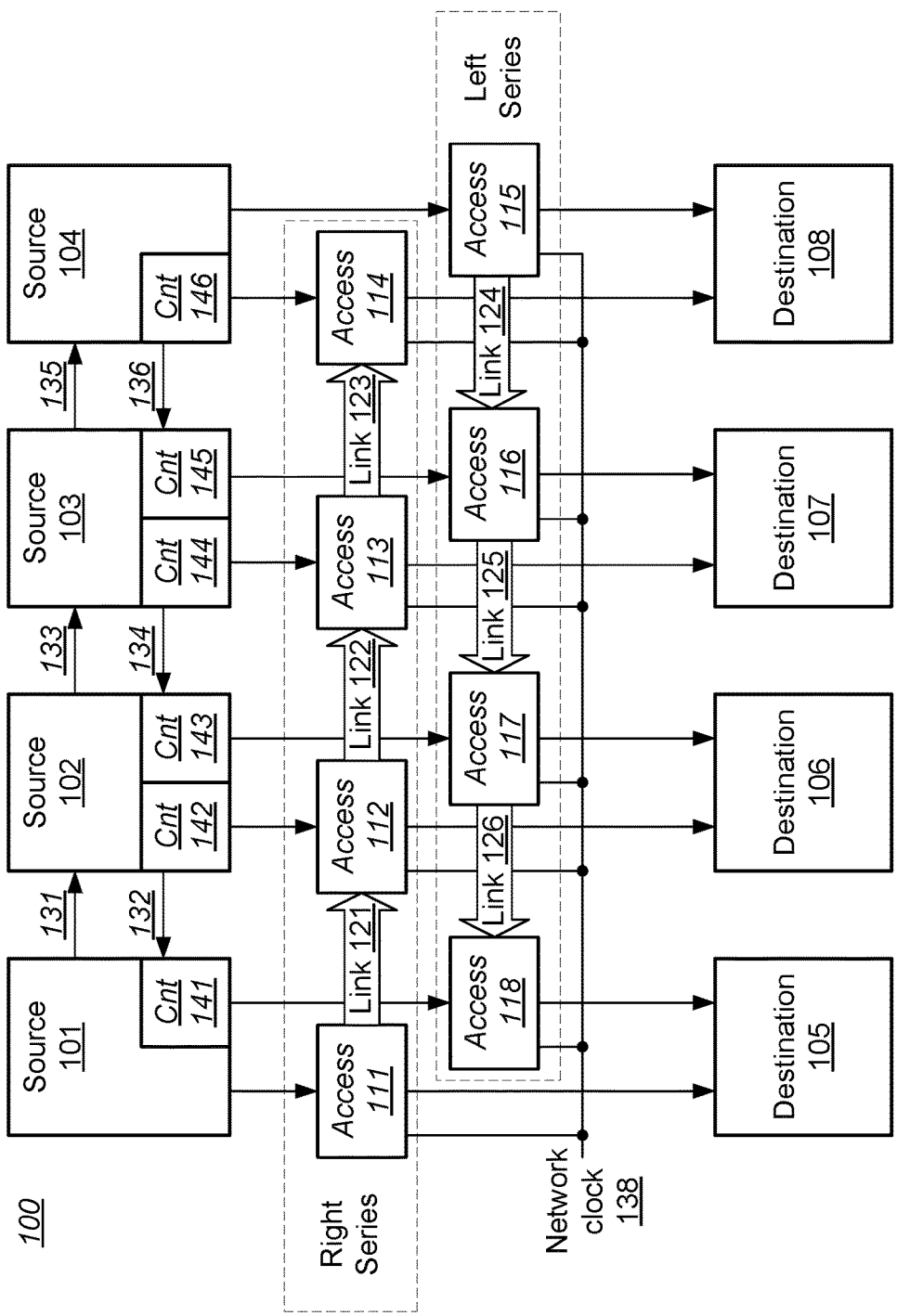
FIG. 1 illustrates a block diagram of an embodiment of a multi-source and multi-destination communication network.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

A communication network may be used in a system to transfer "data transactions" from a set of "source" nodes to a set of "destination" nodes. In various embodiments, this system may include two or more nodes coupled to the communication network, in which the nodes correspond to separate computing systems, modules in a given computing system, circuit blocks on a common integrated circuit, or a combination thereof. For example, in a multi-core processor, a set of two or more cores may be coupled via a communication network to a number of banks of one or more cache memories to send requests for cached data. Such a communication network may be separate from a system bus, and may reduce size and complexity when compared to a bus structure. A less complex communication network may, however, introduce issues concerning equal access to the network by all source nodes coupled to the network.

As used herein, a "source" node refers to any suitable computer system, module, or circuit that may generate data transactions for other nodes. A "destination" node, similarly, refers to any suitable computer system, module, or circuit that may receive a data transaction from a source node. In addition, a "data transaction" may refer to any suitable size packet of data (e.g., one data bit to any number of data bits) to be sent from a source node to a destination node. A data transaction may include a command from the source node to be executed by the destination, a request from the source node for data from the destination node, or data sent from the source to the destination in response to a request or command.

Systems and methods described herein disclose embodiments that may improve equal access to a communication network by multiple source nodes coupled to the network. Use of these systems and methods may improve overall performance of processor.

FIG. 1 illustrates a block diagram of an embodiment of a processing system including a multi-source and multi-destination communication network. In the illustrated embodiment, system 100 includes source nodes (Source) 101-104, each coupled to two respective access units (Access) 111-118. Each of access units 111-118 is coupled to a destination node (Destination) 105-108. Access units 111-114 are coupled in series by links 121-123. Access units 115-118 are coupled in series by links 124-126. Each of source nodes 101-104 includes at least one count value (Cnt) 141-146.

In the illustrated embodiment, access units 111-118, combined with links 121-126, form a dedicated network to allow source nodes 101-104 to send data transactions to destination nodes 105-108. Source nodes 101-104 may correspond to any suitable type of computer system, module, or circuit that generates a command, request, or data to be sent to one of destination nodes 105-108. For example, in various embodiments, source nodes 101-104 may each correspond to a processor or processor core, a cache memory, or a co-processor (e.g., a graphics processor, an audio processor, a math processor, an encryption unit, and the like). Each source node 101-104 may be the same type of node, or source nodes 101-104 may include a mix of two or more types of nodes.

Source nodes 101-104 generate and send data transactions to one or more of destination nodes 105-108. A data transaction may include an address or other type of identifier to indicate which of destination nodes 105-108 the data transaction is to be sent. In some embodiments, a given data transaction may be sent to more than one destination node, and therefore, include an appropriate number of addresses. Each destination node 105-108 may correspond to any suitable type of computer system, module, or circuit that receives a command, request, or data from one of source nodes 101-104, such as, for example, a cache memory, a core, a co-processor, a communication interface (e.g., Ethernet, Universal Serial Bus, Wi-Fi®, and the like). Destination nodes 105-108 receive data from a respective access unit 111-118 if the address of the data transaction matches an address of a given destination node. The data transaction may be cleared from an access unit 111-118 once it has been delivered to all corresponding addressed destination nodes 105-108. A data transaction, once received by one of access units 111-118, may not be stalled or halted until it has reached its respective final destination node 105-108.

In some embodiments, a destination node 105-108 in system 100 may correspond to a source node on a different communication network, and vice versa. In other words, source nodes 101-104 may send commands or requests to destination nodes 105-108 using the communication network shown in system 100, and destination nodes 105-108 may respond with data or other response acting as a source node using a second communication network. In such an example, source nodes 101-104 may correspond to destination nodes.

In the embodiment of system 100, source nodes 101-104 use access units 111-114 to send data transactions to destination nodes to their right and use access units 115-118 to send data transactions to destination nodes to their left. For example, source node 102 may use access unit 112 to send a data transaction to destination nodes 107 or 108, and use access unit 117 to send a data transaction to destination node 105. In the illustrated embodiment, source node 102 may use either access unit 112 or access unit 117 to send a data transaction to destination node 106.

Each access unit 111-118 may be capable of storing a single data transaction at any given point in time. Access units 111-118 receive network clock 138 that initiates a transfer of a currently stored data transaction to an adjacent access unit using one of links 121-126. As used herein, "adjacent" refers to a node or unit that coupled to a particular circuit, without other circuits between them, other than nodes that may be used to facilitate communication. For example, Access unit 112 is adjacent to access units 111 and 113, but not access unit 114. In addition, source node 103 is adjacent to source nodes 102 and 104, but not source node 101.

Periods of network clock 138 correspond to "transfer cycles" of the communication network including access units 111-118. A transfer cycle is initiated by, in various embodiments, either a rising or a falling transition of network clock 138. Data transactions are transferred during each transfer cycle to the next access unit in the series.

In the illustrated embodiment, access units 111-114 combine to form a right series, in which data transactions are transferred to a respective access unit to the right of a current access unit. Access unit 111 transfers a currently stored data transaction to access unit 112, access unit 112 transfers to access unit 113, and access unit 113 transfers to access unit 114. Access units 115-118, similarly, form a left series, moving data transactions from a current access unit to an access unit to the left. Access unit 115 transfers data transactions to access unit 116, and so forth. It is noted that access units 114 and 118 are at the end of their respective series, and therefore, any data transactions they receive should be addressed to destination nodes 108 and 105, respectively, otherwise, an error condition may occur. Although eight access units are depicted in the embodiment of FIG. 1, in other embodiments, any suitable number of access units may be employed.

Source nodes 101-104 may send a data transaction to a respective access unit 111-118 if the respective access unit 111-118 does not currently hold a data transaction. Source nodes 101-104, therefore, hold any data transactions until the respective access unit is available. For example, if source node 103 has a data transaction to send to destination node 106, then source node 103 holds the data transaction until access unit 116 is available. Since source nodes 101 and 104 are at the beginning of the right and left series, respectively, source node 101 does not have to wait to send a data transaction via access unit 111 and source node 104 does not have to wait to send a data transaction via access unit 115. An issue, therefore, could occur in which source node 101 or source node 104 seizes control over the right or left series, respectively, by continuously sending data transactions. Source nodes 102 and 103 would, therefore, be unable to send data transactions via the respective series until the controlling source node ceases to send data transactions.

To mitigate this issue, each source node 101-104 includes at least one of count values 141-146. In addition, each of source nodes 101-104 has at least one halt indicator signal 131-136 coupled to adjacent source nodes. Halt indicator signals 131-136 are used by their respective source nodes of source nodes 101-104 to indicate when the respective source node 101-104 is in a "halt state." A "halt state," as used herein, refers to a state where a particular one of source nodes 101-104 ceases attempts to place data transactions onto a respective access unit 111. At least two types of halt states are disclosed herein. A "forced" halt occurs when a particular source node 101-104 has a data transaction to send, but has no storage location to hold the data transaction. In some embodiments, one of source nodes 101-104 may include a buffer or queue to hold data transactions until the respective access unit 111-118 is available. In such embodiments, a forced halt may not occur until the buffer or queue is full.

In the illustrated embodiment, when source node 102 enters a forced halt state in a given transfer cycle, source node 102 asserts halt indicator signals 132 and 133 in the next transfer cycle. In addition, source node 102 increments count values 142 and 143. In some embodiments, count values 142 and 143 may be incremented in response to source node 102 entering the halt state. In other embodiments, count values 142 and 143 may be incremented for each period of network clock 138 that source node 102 is in the halt state.

Source nodes 101 and 103 receive the asserted halt indicator signals 132 and 133, respectively. In the illustrated embodiment, source node 101 decrements count value 141 in response to detecting the asserted state of halt indicator signal 132 at the beginning of a new transfer cycle. Source node 101 also compares the new count value 141 to a threshold value and if the new count value 141 satisfies the threshold value, then source node 101 enters a "broadcast" halt state, i.e., a second type of halt state that is triggered by an assertion of a received halt indicator signal.

As used herein, to "satisfy a threshold value" refers to a variable meeting a predetermined condition associated with the threshold. In various embodiments, to satisfy a threshold may refer to a count value being greater than, less than, or equal to the threshold value. In the illustrated embodiment, zero is the threshold value and count value 141 satisfies the threshold when it is less than zero. Other values may be used in other embodiments. A threshold value may be selected based on one or more performance metrics, such as, for example, an acceptable time period that a given source node may be in a forced halt state.

Source node 103 performs similar actions in response to detecting, at the beginning of a new transfer cycle, that halt indicator 133 is asserted. Count value 144 is decremented and compared to the threshold value. If count value 144 satisfies the threshold, then source node 103 enters a broadcast halt state.

It is noted that, in the illustrated embodiment, count values are incremented when entering a halt state due to an access unit being unavailable and are decremented in response to detecting an assertion of a halt indicator signal from an adjacent source node. In other embodiments, the logic may be different, resulting in the incrementing and decrementing actions being reversed.

It is also noted that the embodiment of the communication network illustrated in FIG. 1 is merely one example. In other embodiments, different numbers and configurations of source and destination nodes are possible and contemplated. In addition, although the number of source nodes matches the number of destination nodes, different numbers of each type of node may be used in various embodiments.

Figure 2:
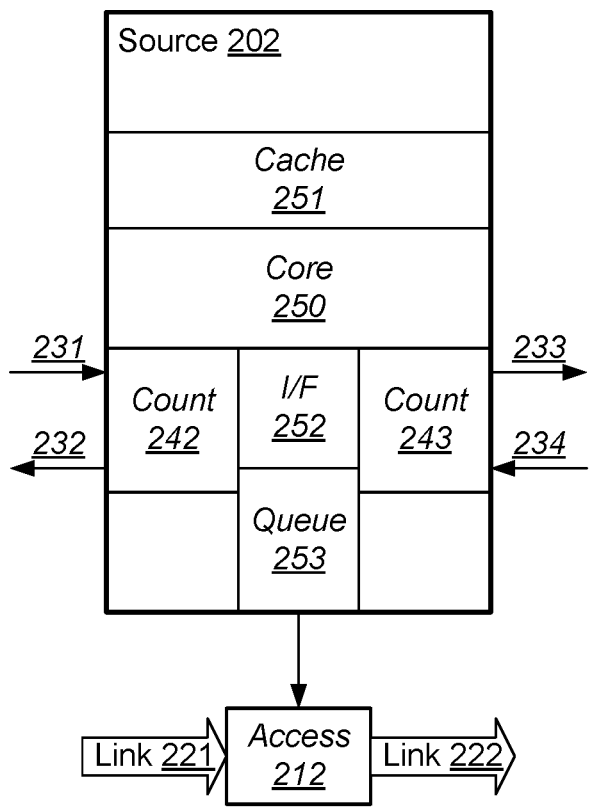
FIG. 2 shows a block diagram of an embodiment of a network node.

Turning now to FIG. 2, a block diagram of an embodiment of a node network node is shown. Node 200 may correspond to an embodiment of source node (Source) 102 and access unit (Access) 112 in FIG. 1. Node 200 includes source node 202 coupled to access unit 212. Source node 202 includes core 250, cache memory (Cache) 251, access interface (I/F) 252, queue 253, and counters (Count) 242 and 243. Source node 202 receives halt indicator signal 231 from an adjacent preceding source node (not shown) and halt indicator signal 234 from an adjacent succeeding source node (also not shown). In addition, source node 202 generates halt indicator signals 232 and 233. Access unit 212 receives data transactions via link 221 and sends data transactions via link 222.

Core 250 may correspond to any suitable processing core. For example, if source node 202 corresponds to a core within a multi-core processor, then core 250 may correspond to a suitable core, such as, for example, an Intel x86, a Sun SPARC™, a PowerPC™, and the like. If, however, source node 202 corresponds to a cache memory, a co-processor, an networking interface, or other type of circuit, then core 250 may correspond to a real-time processing core, such as, for example, an ARM Cortex-M®. Core 250 may, in some embodiments, correspond to a state machine designed for to execute specific tasks.

Cache 251 may, in some embodiments, correspond to an L1 cache for core 250. In other embodiments, such as if source 202 corresponds to a cache memory, then cache 251 may correspond to one or more banks of an L2 or L3 cache memory while core 250 corresponds to a cache controller, managing additions to, evictions from, and validity of data stored within cache 251.

Access interface 252 includes circuitry for managing data transactions sent via access unit 212. Access interface, in the illustrated embodiment, may include logic for placing data transactions onto queue 253 to be sent to access unit 212, including determining availability of locations in queue 253, and, therefore, may determine if source 202 enters a halt state. As used herein, "available" and "availability," in regards to queues and access units, refers to a storage location being unused and therefore capable of storing another data transaction. In some embodiments, data corresponding to a previously stored data transaction may still be held in an available storage location, but is currently invalid and therefore may be overwritten with a new data transaction.

The circuitry of access interface 252 may also manage incrementing and decrementing counter circuits 242 and 243, including detecting assertion of halt indicator signals 231 and 234, as well as asserting halt indicator signals 232 and 233. Count values of counter circuits 242 and 243, in the illustrated embodiment, are initially set to zero, which also corresponds to a threshold value. Positive count values indicate that source node 202 has entered a halt state more times than other source nodes in a same network. Negative count values indicate that source node has entered a halt state fewer times than at least one other source node in the same network, and that source node 202 has or will enter a broadcast halt state in the current transfer cycle. In other embodiments, incrementing and decrementing of counter circuits 242 and 243 may be reversed. Additionally, other threshold values may be used and the count values may be initialized accordingly.

Queue 253 corresponds to any suitable memory or set of registers for storing a data transaction that is ready to be sent in response to an available slot occurring in access unit 212. When a data transaction is not received by access unit 212 via link 221, then an available slot occurs in access unit 212, i.e., a data transaction is not held in access unit 212 for the current transfer cycle. If queue 253 holds at least one data transaction, then the oldest data transaction in queue 253 is transferred into access unit 212 and is sent via link 222 in the next transfer cycle. Queue 253 may be any suitable size, including, just large enough to store one data transaction, or large enough to hold thousands of data transactions or more.

If an available slot does not occur in access unit 212 for enough transfer cycles, then queue 253 may become filled. Access interface 252 may then cause source node 202 to enter a forced halt state. Core 250 may not be allowed to generate further data transactions until at least one location in queue 253 is cleared by sending a data transaction to access unit 212. Access interface 252 also asserts halt indicators 232 and 233. The assertion of halt indicator signal 232 may cause a preceding source node to enter a broadcast halt state, which may result in an available slot occurring for access unit 212 in a following transfer cycle.

In the illustrated embodiment, source node 202 is shown coupled to access unit 212. Source node 202, however, may be coupled to additional access units, such as support communication via a right series and a left series as illustrated in FIG. 1. To facilitate communication via another access unit, source node 202 may include an additional access interface, queue, and counters.

The embodiment of node 200 illustrated in FIG. 2 is merely an example for demonstrative purposes. Various functional blocks have been omitted for clarity. In various embodiments, different functional blocks may be included and are contemplated. Furthermore, FIG. 2 merely illustrates logical arrangement of the various circuit blocks and is not intended to demonstrate a physical layout of the illustrated circuit blocks.

Figure 3:
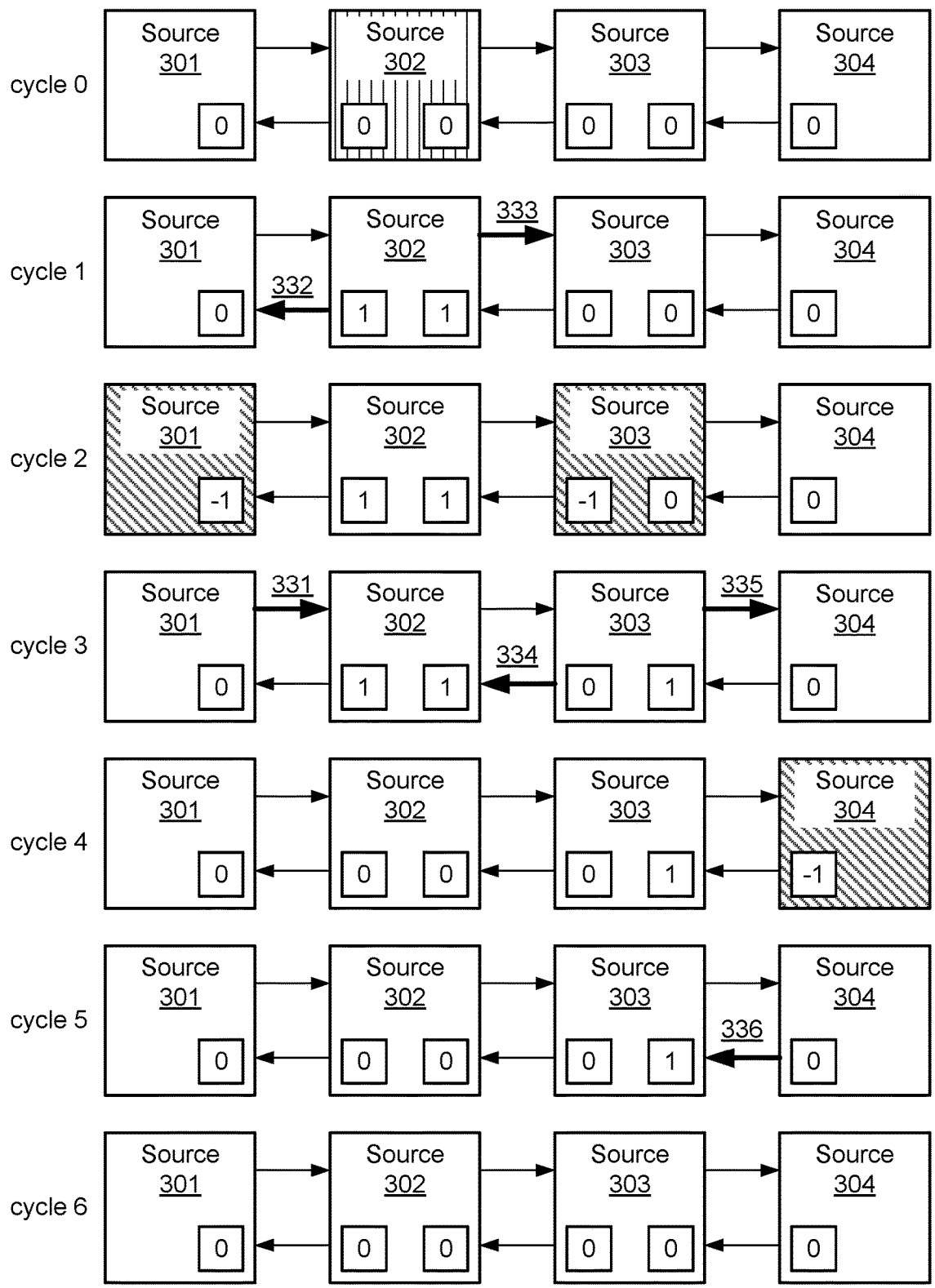
FIG. 3 is a block diagram depicting a flow of control signals between four source nodes in an embodiment of a communication network.

Moving now to FIG. 3, a block diagram showing a flow of control signals between four source nodes in an embodiment of a communication network is depicted. FIG. 3 includes four source nodes 301-304, which, in some embodiments, may correspond to source nodes 101-104 in FIG. 1. FIG. 3 depicts an example of states of halt indicator signals and count values for each source node 301-304 over the course of seven transfer cycles in response to a forced halt state by source node 302. Vertically shaded boxes indicate the corresponding source node 101-104 is in a forced halt state, while diagonally shaded boxes indicate the corresponding source node 101-104 is in a broadcast halt state.

In transfer cycle 0, count values in each of source nodes 301-304 are equal to zero, indicating no previous halt states, either forced or broadcast. Source node 302, however, enters a forced halt state during cycle 0. In transfer cycle 1, in response to entering the forced halt state in cycle 0, source node 302 asserts both halt indicator signals 332 and 333. In addition, both count values of source node 302 are incremented from 0 to 1. Source nodes 301 and 303 each detect the asserted state of halt indicator signals 332 and 333.

In transfer cycle 2, source nodes 301 and 303 respond to the asserted state of halt indicator signals 332 and 333 detected in cycle 1 by decrementing their respective count values associated with source node 302 from 0 to −1. Since these count values are both under the threshold value of 0, both source nodes 301 and 303 enter broadcast halt states in cycle 2. In transfer cycle 3, both source nodes 301 and 303 increment their respective count values. Source node 301 increments its count value from −1 to 0, while source node 303 increments its count value associated with source node 302 from −1 to 0, and its count value associated with source node 304 from 0 to 1. Source node 301 asserts halt indicator signal 331, while source node 303 asserts halt indicator signals 334 and 335. Source node 302 detects the asserted halt indicator signals 331 and 334, while source node 304 detects asserted halt indicator signal 335.

Referring to transfer cycle 4, source node 302 decrements both of its count values from 1 to 0 in response to detecting the asserted halt indicator signals 331 and 334 in cycle 3. Since the count values of 0 are not below the threshold value (also 0), source node 302 does not enter a broadcast halt state. Source node 304, in contrast, decrements its count value from 0 to −1, thereby triggering a broadcast halt state. In transfer cycle 5, source node 304 asserts halt indicator signal 336, which is detected by source node 303. Moving to transfer cycle 6, source node 303 decrements its count value associated with source node 304 from 1 to 0.

It is noted that, by cycle 6 in the illustrated embodiment, each of source nodes 301-304 has entered just one halt state. Source node 302 entered a forced halt state, while each of source nodes 301, 303, and 304 entered broadcast halt states. As of cycle 6 all count values are equal to the initial value of 0. The forced halt state of source node 302 is referred to herein as having "propagated though the network" once each of source nodes 301-304 return to their initial state.

The example depicted in FIG. 3 is merely one embodiment. In other embodiments, halt indicator signals may be asserted in different transfer cycles. Count values may be updated in different cycles in some embodiments.

Figure 4:
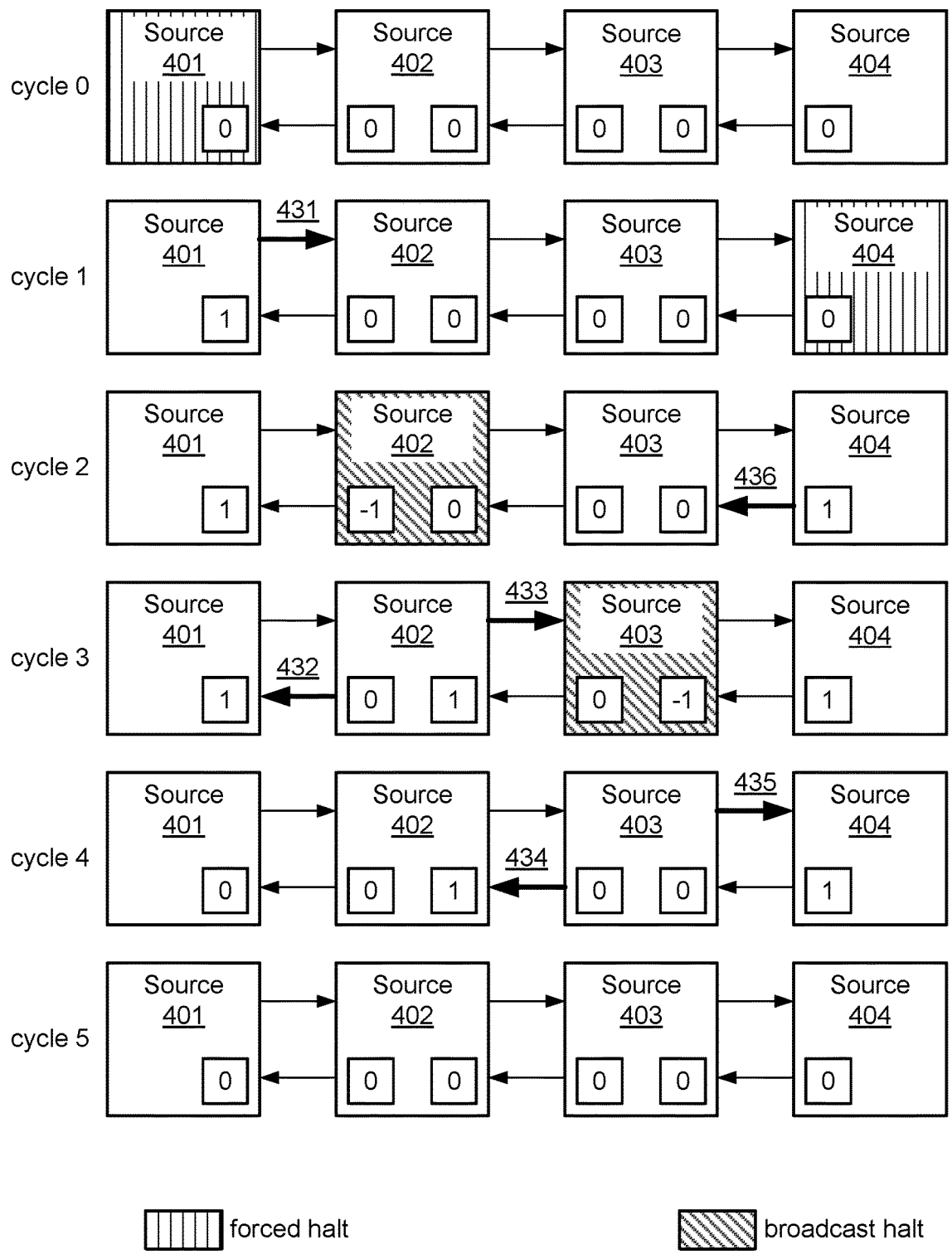
FIG. 4 illustrates another block diagram showing a flow of control signals between four source nodes in an embodiment of a communication network.

Turning to FIG. 4, a block diagram depicting a flow of control signals between four source nodes in another embodiment of a communication network is illustrated. Similar to FIG. 3, FIG. 4 includes four source nodes 401-401, which, in some embodiments, may correspond to source nodes 101-104 in FIG. 1. FIG. 4 also shows an example of states of halt indicator signals and count values for each source node 401-404 over the course of six transfer cycles in response to a forced halt state on two of the four source nodes 401-404. As with FIG. 3, vertically shaded boxes indicate the corresponding source node 101-104 is in a forced halt state, while diagonally shaded boxes indicate the corresponding source node 101-104 is in a broadcast halt state.

In transfer cycle 0, count values in each of source nodes 401-404 are again equal to zero, indicating no previous halt states, either forced or broadcast. Source node 401 enters a forced halt state during cycle 0. In transfer cycle 1, source node 401 increments its count value and asserts halt indicator signal 431 in response to the forced halt in cycle 0. Source node 402 detects asserted halt indicator signal 431. In addition, source node 404 enters an unrelated forced halt state in cycle 1. Moving to transfer cycle 2, Source node 402 decrements it count value associated with source node 401 from 0 to −1. In response to this count value being less than the threshold value of 0, source node 402 enters a broadcast halt state. Meanwhile, source node 404 increments its count value from 0 to 1 and asserts halt indicator signal 436 in response to the forced halt state of cycle 1. Source node 403 detects the asserted halt indicator signal 436.

In transfer cycle 3, source node 402 increments both of its count values and asserts both halt indicator signals 432 and 433 in response to the broadcast halt state of cycle 2. Source nodes 401 and 403 detect these assertions. In the same cycle, source node 403 decrements its count value associated with source node 404 from 0 to −1 in response to detecting the assertion of halt indicator signal 436 in cycle 2. Source node 403 enters a broadcast halt state in response to this count value being below the threshold value. In transfer cycle 4, source node 401 decrements its count value associated with source node 402 from 1 to 0 in response to detecting the assertion of halt indicator signal 432. Since 0 is not less than threshold value (i.e., 0), source node 401 does not enter a broadcast halt state. In response to the broadcast halt state in cycle 3, source node 403 asserts both halt indicator signals 434 and 435. In addition, source node 403 increments the count value associated with source node 404 from −1 to 0. The count value in source node 403 that is associated with source node 402, however, remains at 0. The broadcast halt state in cycle 3 triggers an increment to the count value while the assertion of halt indicator signal 433 triggers a decrement to the same count value, therefore, negating any changes and the count value in source node 403 associated with source node 402 remains at 0.

Both source nodes 402 and 404 detect the assertions of halt indicator signals 4343 and 435, respectively, in cycle 4. Moving to cycle 5, source node 402 decrements its count value associated with source node 403 from 1 to 0 in response to the assertion of halt indicator 434 in cycle 4. Source node 404, similarly, decrements its count value associated with source node 403 from 1 to 0 in response to the assertion of halt indicator signal 435.

Similar to what was shown in FIG. 3, each of source nodes 401-404, in the embodiment of FIG. 4, enters just one halt state and all count values return back to 0. Both of source nodes 401 and 404 enter forced halt states while each of source nodes 402 and 403 enter broadcast states. None of source nodes 401-404 enter a second halt state in response to the two forced halt states in cycles 0 and 1. In addition, the two forced halt states propagate through the network by cycle 5.

It is noted that FIG. 4 is merely one example embodiment. In other embodiments, additional forced halt states may be entered by any one of source nodes 401-404. In some embodiments, assertion of halt indicator signals and adjustments to count values may be updated in different cycles than illustrated.

Figure 5:
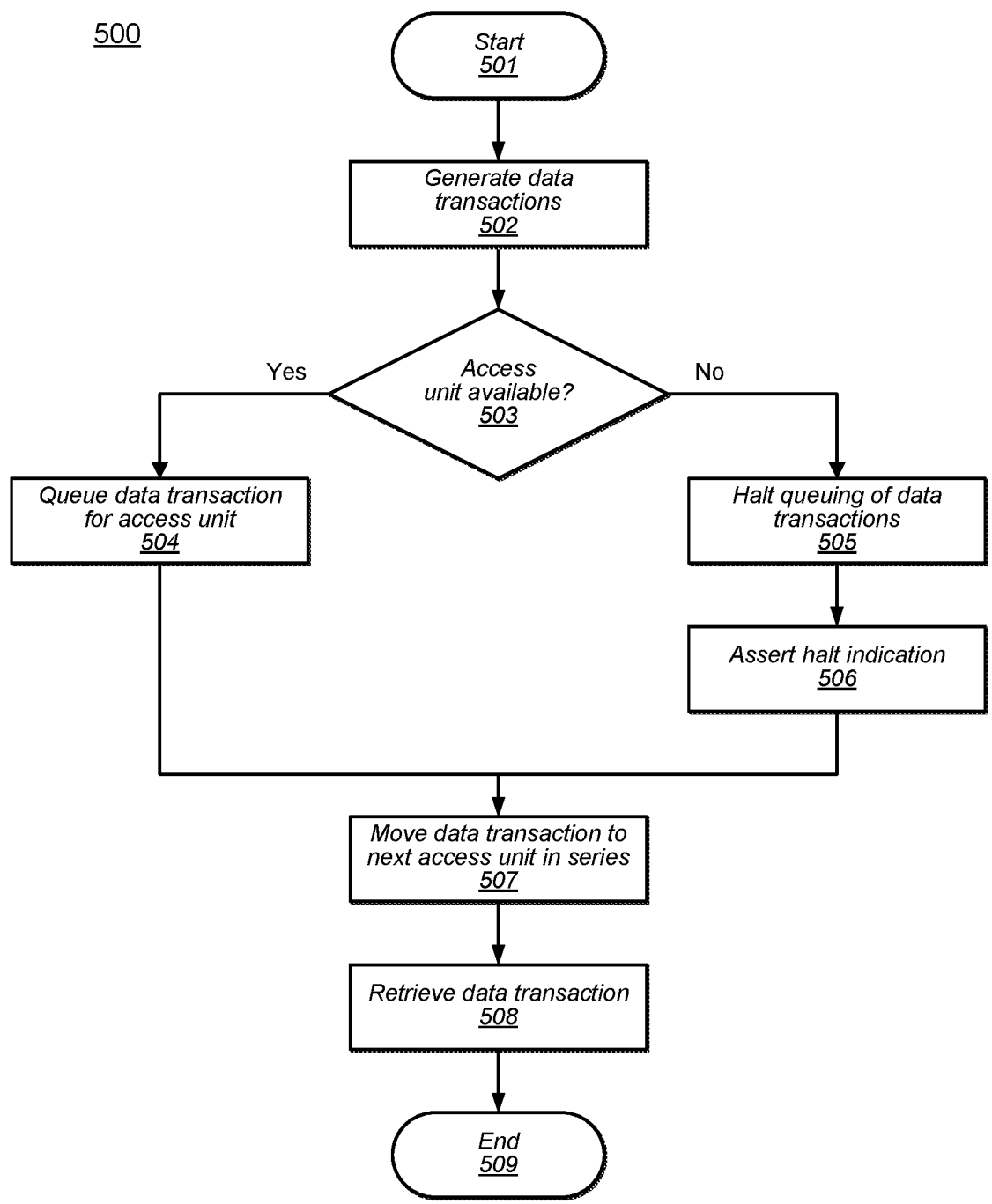
FIG. 5 shows a flowchart for an embodiment of a method for operating a communication network.

Moving to FIG. 5, a flowchart for an embodiment of a method for operating a communication network is shown. Method 500 may be applicable to a multi-source and multi-destination communication network, such as system 100 in FIG. 1. Referring collectively to FIG. 1 and method 500 of FIG. 5, the method may begin in block 501.

A data transaction is generated (block 502). A source node, such as, for example, source node 103, generates a data transaction to be sent to a destination node, such as, for example, destination node 105. The data transaction may include a command, a request, or other type of data, and may also include a destination identifier such as an address for destination node 105.

Further operations of method 500 may depend on an availability of an access unit (block 503). To send the data transaction to destination node 105, source node 103 may place the data transaction into access unit 116. A slot on access unit 116 must be available before the data transaction can be placed in access unit 116. In some embodiments, an interface to access unit 116 may include a queue to store data transactions to be sent via access unit 116. In such embodiments, a slot may be considered to be available if a location in the queue is available. If a slot is available for access unit 116, then the method moves to block 504 to queue the data transaction for transfer by access unit 116. Otherwise, the method moves to block 505 to halt queuing of data transactions.

In response to an availability of the access unit, the data transaction is queued for transfer (block 504). In systems using queues, the data transaction is placed in an available location in the queue. In systems with no queue, the data transaction is transferred to access unit 116. The method moves to block 507 to move the data transaction to a next access unit in a series of access units.

In response to the access unit not being available, queuing of data transactions is halted (block 505). Source node 103 halts further queuing of data transactions after determining that the access unit 116 is unavailable. This halting action is referred to herein as a forced halt state.

A halt indication is asserted (block 506). Upon entering the forced halt state, source node 103 asserts its respective halt indicator signals 134 and 135. In addition, source node 103 may increment one or more count values in response to entering the forced halt state.

The access unit moves a current data transaction to a next access unit in the series (block 507). Access unit 116 may either hold a data transaction received from a previous access unit in the series, e.g., access unit 115, or may receive the data transaction from source node 103. The data transaction current held in access unit 116 is transferred to a next access unit in the series, access unit 117. Access unit 116 may receive either a data transaction from access unit 115 if access unit 115 holds a data transaction to transfer, or otherwise receive a data transaction from source node 103.

A destination node receives a data transaction (block 508). Destination node 105 receives a data transaction from access unit 118 if the data transaction has a destination identifier, such as an address, that matches an identifier of destination node 105. Once the data transaction from source node 103 is transferred to access unit 116 and then moved from access unit 116, through access unit 117, and into access unit 118, then destination node 105 may be able to retrieve the data transaction and the transaction may be removed from access unit 118. The method ends in block 509.

It is noted that method 500 of FIG. 5 is merely an example. Variations of the disclosed method are possible. For example, different numbers and different orders of the presented blocks may be employed. For example, in other embodiments, operations in blocks 505 and 506 may be in reverse order or may be completed in parallel.

Figure 6:
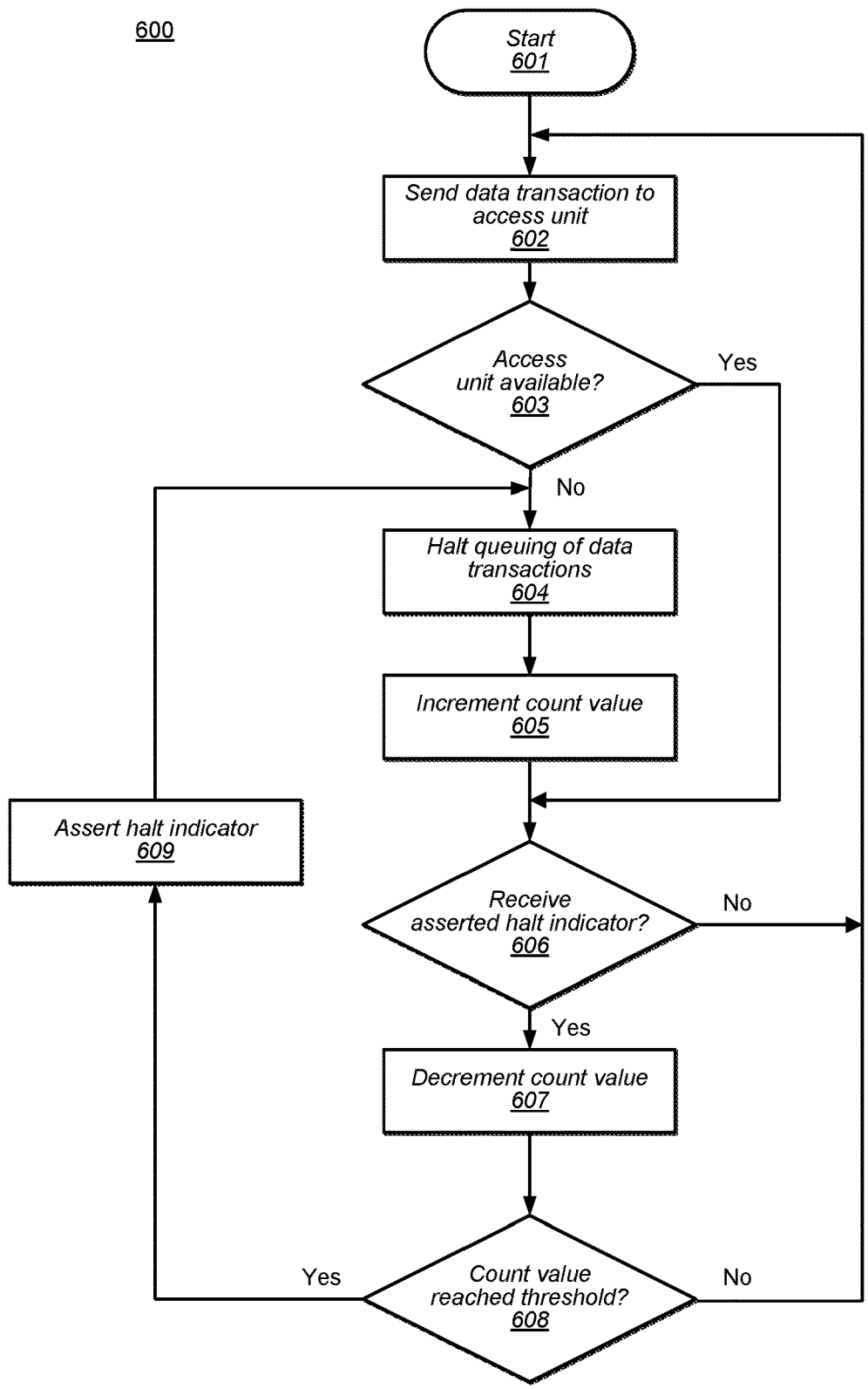
FIG. 6 depicts a flowchart for another embodiment of a method for operating a communication network.

Turning now to FIG. 6, a flowchart for another embodiment of a method for operating a communication network is depicted. Method 600, similar to method 500 in FIG. 5, may be applicable to a multi-source and multi-destination communication network, such as system 100 in FIG. 1. Operations of method 600 may also be combined with operations of method 500. Referring collectively to system 100 of FIG. 1, network node 200 of FIG. 2, and method 600 of FIG. 6, the method may begin in block 601.

A data transaction is sent to an access unit (block 602). Source node 202 (which may correspond to source node 102 in FIG. 1 for this example) has a data transaction, prepared by core 250, ready to send to a destination node, such as, destination node 107, for example. Core 250 sends the data transaction to access interface 252 for transfer to access unit 212.

Further operations of method 600 may depend on an availability of the access unit (block 603). In the illustrated embodiment, access interface 252 determines if queue 253 has an available location to store the data transaction received from core 250. In other embodiments, queue 253 may be omitted and access interface may determine if access unit 212 has an available slot to receive the data transaction. If access interface determines that queue 253 does not have an available location for the data transaction, then the method moves to block 604 to halt queuing of further data transactions. Otherwise, the method moves to block 606 to determine if an asserted halt indicator has been received.

In response to the access unit not being available, queuing of data transactions is halted (block 604). After determining that the access unit is unavailable, source node 202 enters a forced halt state and access interface 252 ceases further queuing of data transactions. In addition, access interface 252 asserts halt indicator signals 232 and 233. may increment one or more count values in response to entering the forced halt state.

At least one count value is incremented (block 605). In response to the forced halt state, access interface 252 increments count values in both counter circuits 242 and 243. In other embodiments, source node 202 may include a single counter circuit with a single count value. In some embodiments, source node 202 may not include counter circuits and instead increment a value of one or more memory locations or registers.

Continuing operations of the method may depend on a state of a halt indicator signal (block 606). Access interface 252 monitors halt indicator signals 231 and 234 that are received from other source nodes in the network, such as, for example, source nodes 101 and 103. An assertion of either halt indicator signal 231 or 234 may indicate that either source node 101 or source node 103, respectively, has entered a halt state. If either halt indicator signal 231 is asserted, then the method moves to block 607 to decrement a corresponding count value. Otherwise, the method returns to block 602 to send a next data transaction.

In response to receiving an asserted halt indicator signal, a corresponding count value is decremented (block 608). In the illustrated embodiment, counter circuit 242 corresponds to halt indicator signal 231 and counter circuit 243 corresponds to halt indicator signal 234. Access interface 252 determines which received halt indicator signal is asserted and decrements a count value of the corresponding counter circuit, 242 or 243. If both halt indicator signals 231 and 234 are asserted, then the count values for both counter circuits 242 and 243 are decremented.

Further operations of method 600 may depend on a count value (block 608). Access interface 252 determines if the count value of counter circuits 242 or 243 satisfies a threshold. In the illustrated embodiment, the threshold value is zero and if a count value is less than zero, the threshold is satisfied. In other embodiments, other thresholds may be selected, and other conditions may be used to determine if the threshold is satisfied. If the count value for either counter circuit 242 or 243 is less than zero, then the method moves to block 609 to assert a halt indicator signal. Otherwise, the method returns to block 602 to send a next data transaction.

If at least one count value satisfies the threshold, then at least one halt indicator signal is asserted (block 609). In the illustrated embodiment, access interface 252 asserts both halt indicator signals 232 and 233, regardless of which count value is less than zero. Source node 202 also enters the broadcast halt state. The method returns to block 604 to halt queuing of further data transactions in response to entering the broadcast halt state.

Method 600 of FIG. 6 is merely an example. In other embodiments, different operations and different numbers of operations are possible and contemplated. Operations may be performed in a different order and, in some embodiments, may be performed in parallel. Although count values are disclosed as incrementing in block 605 and decrementing in block 607, the logic may be altered such that the reverse is true.

Figure 7:
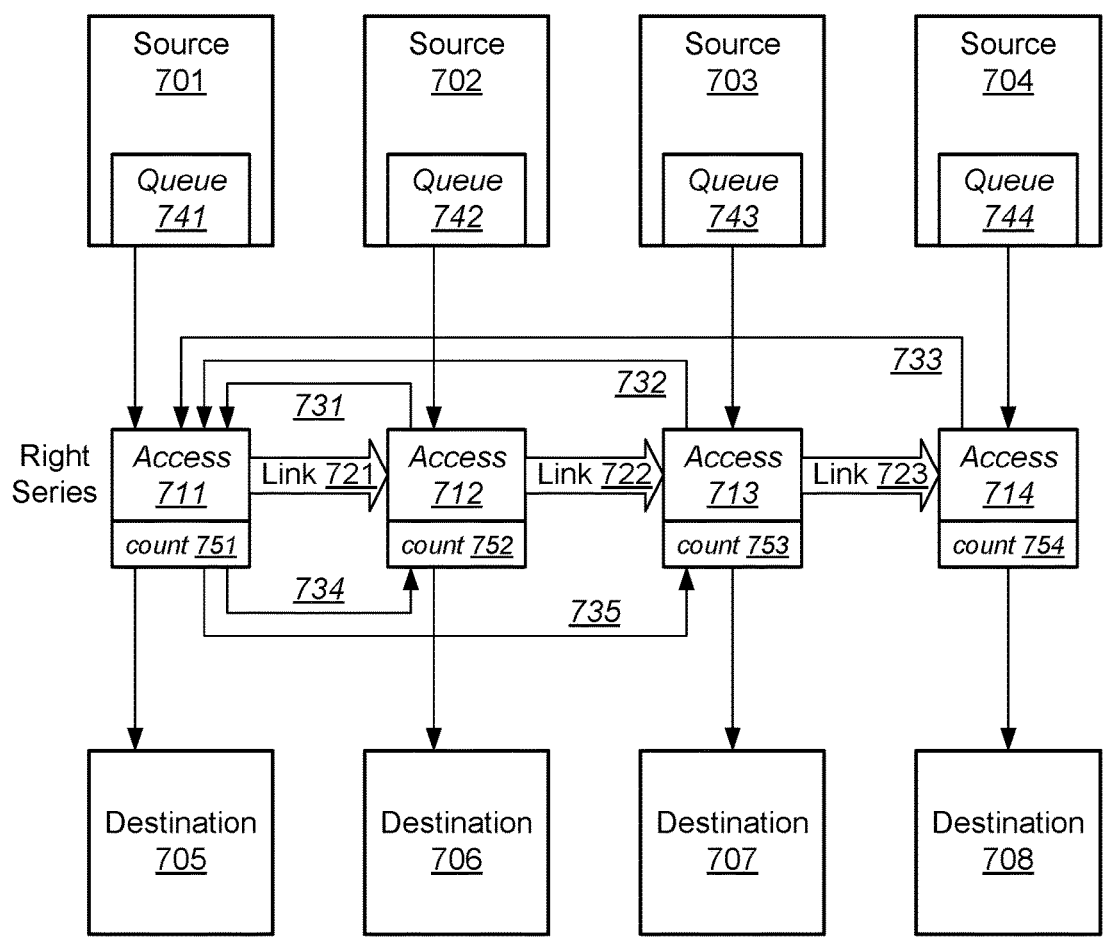
FIG. 7 illustrates a block diagram of another embodiment of a communication network.

Moving now to FIG. 7, a block diagram of another embodiment of a communication network is presented. System 700 may be utilized in combination with system 100 in FIG. 1. In the illustrated embodiment, system 700 includes source nodes 701-704, each coupled to a respective access unit 711-114. Each of access units 711-714 are coupled to a respective destination node 705-708. Each of source nodes 701-704 includes a respective queue 741-744. Each of access units 711-714 includes a respective count value (count) 751-754. Access units 711-714 are coupled in series by links 721-723. Access units 711-714 utilize stall signals 731-733 and acknowledge signals 734 and 735.

Source nodes 701-704, destination nodes 705-708, and access units 711-714 may correspond to the similarly named and numbered components shown in FIG. 1. Descriptions of these components, therefore, are as disclosed above in regards to FIG. 1, except as noted below. Description of queues 741-744, similarly, may correspond to the description of queue 253 in FIG. 2. Although only a right series of access units is illustrated for clarity, system 700 may further include a left series of access units.

In the illustrated embodiment, source nodes 701-704 may generate data transactions to be delivered destination nodes 705-708. For example, source node 702 may generate a data transaction to be delivered to destination node 708. This data transaction is stored in queue 742 until access unit 712 has an available slot to receive the data transaction. When a data transaction is transferred from one of queues 741-744, to a respective access unit 711-714, it is referred to herein as "forward progress" of the queue. If however, source node 701 has a large number of data transactions queued in queue 741 for transfer, the data transactions from queue 741 may receive preference over the data transaction in queue 742 due to queue 741 preceding queue 742 in the right series. Queue 741, therefore, has unblocked access to access unit 711, allowing queue 741 to transfer its stored data transactions one after another, leaving no available slots for queue 742. Queue 742, therefore, makes no forward progress.

Access unit 712 includes count value 752. Count value 752 increments for each transfer cycle that queue 742 has a data transaction to send but access unit 712 has no available slot to receive the data transaction. In other words, count value 752 may be incremented in each transfer cycle that queue 742 is blocked from making forward progress. When count value 752 satisfies a threshold, for example, if count value 752 reaches a threshold of eight, then access unit 712 asserts stall signal 731. Upon detecting the asserted state of stall signal 731, access unit 711 enters a stall state, signaling source node 701 that a slot is not available for at least one transfer cycle. At a next transfer cycle, an available slot is generated in access unit 712 due to the stall state of access unit 711. Queue 742 transfers a queued data transaction to access unit 712 and access unit 712 resets count value 752 and de-asserts stall signal 731. Access unit 711 resumes transfers of data transactions from queue 741.

As a second example, source node 703 generates a data transaction for destination node 708, which is stored in queue 743 until an available slot occurs in access unit 713. Again, if source node 701 has a large number of data transactions queued in queue 741 for transfer, an available slot may not occur in access unit 713 for multiple transfer cycles in a row, blocking forward progress of queue 743. Access unit 713 increments count value 753 for each transfer cycle that queue 743 is blocked. When count value 753 satisfies the threshold, access unit 713 asserts stall signal 732. Access units 711 detects the asserted stall signal 732, and enters the stall state. Access unit 711 blocks data transactions from queue 741. Upon generating an available slot, access unit 711 asserts acknowledge signal 734, which indicates to access unit 712 that the next available slot is not to be used by access unit 712. Access unit 712, therefore, allows the available slot to pass through unused to access unit 713. Access unit 713 receives the available slot and is able to receive a data transaction from queue 743. Access unit 713 clears count value 753 after receiving the data transaction and de-asserts stall signal 732.

In the illustrated embodiments, access unit 714 may use stall signal 733 to stall access unit 711 in a similar manner as access unit 713 uses stall signal 732. When stall signal 733 is asserted, both access units 711 and 712 may assert acknowledge signal 735. Access unit 711 may assert acknowledge signal 734 when an available slot is transferred to access unit 712, and assert acknowledge signal 735 when the available slot is transferred to access unit 713. In some embodiments, source node 704 may be capable of sending data transactions directly to destination node 708, and therefore, not require use of stall signal 733. In addition, in various embodiments, available slots created in response to one of stall signals 731-733, may include a tag indicating to which access unit the available slot belongs. Such embodiments may not require acknowledge signals 734 and 735.

It is noted that, in some embodiments, source nodes 701 through 704 may include halt indicator signals and corresponding circuitry as described in regards to FIGS. 1 and 2. In such embodiments, the halt indicator circuitry may be used in place of the stall signals 731-733 to create an available slot in response to detecting a lack of forward progress.

It is also noted that system 700 of FIG. 7 is merely an example for demonstrative purposes. Variations of the disclosed block diagram are possible. For example, different numbers of source or destination nodes may be employed.

Figure 8:
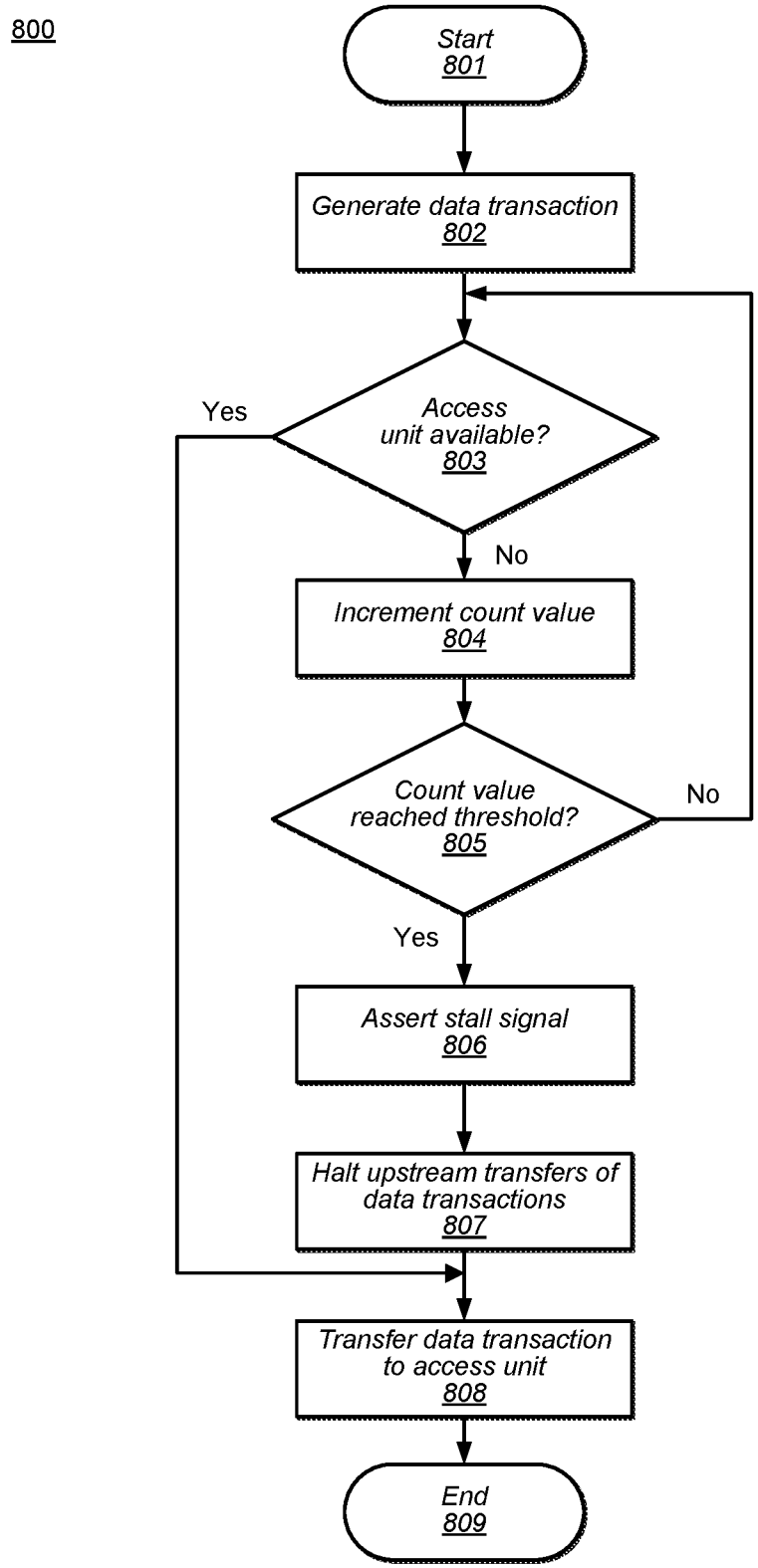
FIG. 8 shows a flowchart for another embodiment of a method for operating a communication network.

Turning to FIG. 8, a flowchart for another embodiment of a method for operating a communication network is shown. Method 800, in some embodiments, may be performed in combination with method 500 and/or method 600 in FIGS. 5 and 6, respectively. Method 800 may be applicable to a multi-source and multi-destination communication network, such as system 700 in FIG. 7. Referring collectively to system 700 of FIG. 7 and method 800, the method may begin in block 801.

A data transaction is generated (block 802). A source node, such as, for example, source node 703, generates a data transaction to be sent to a destination node, such as, for example, destination node 708. The data transaction may include a command, a request, or other type of data, and may also include a destination identifier such as an address for destination node 708. The data request is stored in queue 743 to await transfer to access unit 713.

Continuing operations of method 800 may depend on an availability of an access unit (block 803). To send the data transaction to destination node 708, source node 703 may transfer the data transaction from queue 743 to access unit 713. A slot on access unit 713 must be available before the data transaction can be transferred from queue 743. If a slot is not available in access unit 713, then the method moves to block 804 to increment a count value. Otherwise, the method moves to block 808 to transfer the data transaction to access unit 713.

A count value is incremented (block 804). Access unit 713, in the illustrated embodiment, includes a count value. This count value is incremented for each transfer cycle that access unit 713 is unable to receive the waiting data transaction in queue 743. In various embodiments, access unit 713 may include a counter circuit or may increment a value stored in a memory location. In some embodiments, the count value may be decremented rather than incremented.

Subsequent operations of method 800 may depend on a value of the count value (block 805). After incrementing the count value, access unit compares the incremented value to a threshold value. If the count value reaches the threshold value, then the method moves to block 806 to assert a stall signal. Otherwise, the method returns to block 803 to determine if a slot in access unit 713 is currently available. In other embodiments, the count value may exceed the threshold value before the method moves to block 806.

The access unit asserts a stall signal (block 806). Access unit 713 asserts stall signal 732 upon the count value reaching the threshold value. The asserted stall signal may be received by access units "upstream" from access unit 713, i.e., preceding access units in the right series, such as access units 711 and 712.

Upstream access units halt transfers from respective queues (block 807). Access units 711 and 712 detect the asserted state of stall signal 732 and enter respective stall states. In the stall state, each of access units 711 and 712 blocks further transfers of data transactions from queues 741 and 742, respectively. Each of access units 711 and 712 may remain in the stall state for at least one transfer cycle. By blocking transfers from queue 741, access unit 711 generates an available slot. This available slot is transferred to access unit 712. Access unit 711 may also assert acknowledge signal 734 when the available slot is received by access unit 712. Access unit 712, in response to detecting the asserted state of acknowledge signal 734, allows this available slot to pass through unused. The available slot is transferred to access unit 713 in the following transfer cycle. Access unit 711 may de-assert acknowledge signal 734 upon the available slot arriving at access unit 713.

Once a slot is available in the access unit, the data transaction is transferred to the access unit (block 808). Upon arrival of an available slot in access unit 713, the data transaction waiting in queue 743 is transferred into access unit 713. In the next transfer cycle, the data transaction is transferred to access unit 714 for delivery to destination node 708. Upon transferring the data transaction into access unit 713, access unit 713 resets the count value to an initial value, such as, for example, zero. Access unit 713 also de-asserts stall signal 732. The method ends in block 809.

Method 800 of FIG. 8 is merely an example. In other embodiments, different operations and different numbers of operations are possible and contemplated. Operations may be performed in a different order.

Figure 9:
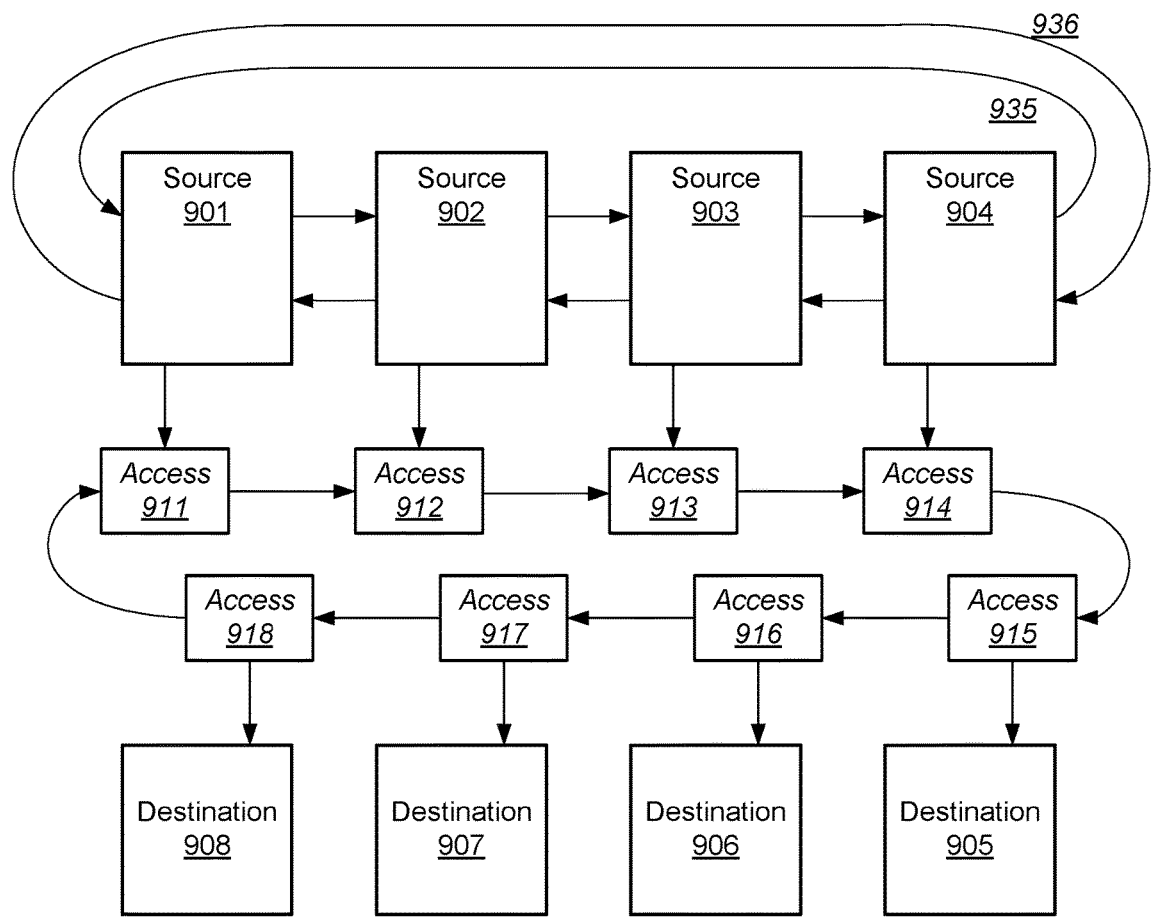
FIG. 9 depicts a block diagram of another embodiment of a communication network.

Proceeding to FIG. 9, a block diagram of another embodiment of a communication network is depicted. System 900 illustrates another structure for implementing a multi-source and multi-destination communication network. Similar to system 100 in FIG. 1, system 900 includes source nodes 901-904, destination nodes 905-908, and access units 911-918.

Source nodes 901-904, destination nodes 905-908, and access units 911-918 may correspond to the similarly named and numbered components shown in FIG. 1. Descriptions of these components, therefore, are as disclosed above in regards to FIG. 1, except as noted. In system 900, rather than employing a right series and a left series of access units, such as illustrated in system 100 of FIG. 1, access units 911-918 are arranged in a loop, such that access unit 918 may transfer any held data transaction to access unit 911. In addition halt indicator signals 935 and 936 are added to allow source nodes 901 and 904 to provide halt indications directly to each other. The operations described in regards to methods 500, 600, and 800 may be applied to system 900.

It is noted that system 900 is merely an example embodiment. In other embodiments, additional network topologies are contemplated for use with the concepts described herein. For example, star network and mesh network topologies may be used in conjunction with methods 500, 600, and 800.

Figure 10:
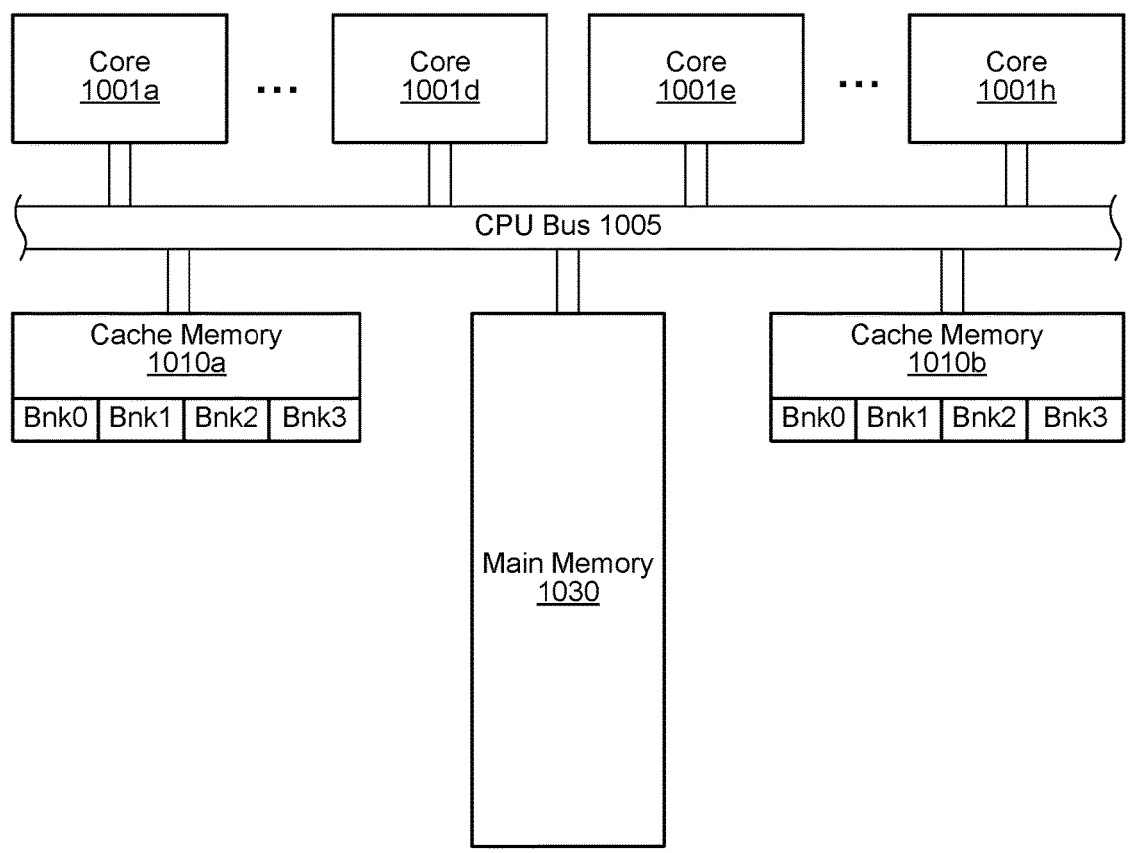
FIG. 10 illustrates a block diagram of an embodiment of a processor.

FIG. 10 illustrates an embodiment of a computer system 1000. In some embodiments, computer system 1000 may include one or more multi-source and multi-destination communication networks such as are disclosed herein. In the illustrated embodiment, computer system 1000 comprises a plurality of functional blocks including processing units 1001a-1001h, cache memories 1010a-1010b, and a main memory 1030. These functional blocks are be coupled through CPU bus 1005.

Cores 1001a-1001h (collectively referred to as cores 1001) may, in various embodiments, be representative of a general-purpose processor that performs computational operations. For example, each processor 1001 may be a central core (CPU) such as a microprocessor, a graphics core (GPU), an application-specific integrated circuit (ASIC), or a field-programmable gate array (FPGA). Cores 1001 may include one or more of the commercially available cores, e.g., the Intel x86 family of processors, the Sun SPARC™ family of processors, the PowerPC™ family of processors, etc.

In some embodiments, cores 1001 may include multiple versions of the same processor, i.e., a homogenous multi-core system. In other embodiments, cores 1001 may include a mix of two or more processors, i.e., a heterogeneous multi-core system.

CPU bus 1005 may couple multiple functional blocks together, thereby allowing communication between the coupled blocks. CPU bus 1005 may support one of any suitable protocols and may be any number of bits wide, such as, e.g., 32 bits, 64 bits or 128 bits wide. CPU bus 1005 may, in various embodiments, support an industry standard bus protocol associated with cores 1001 while, in other embodiments, CPU bus 1005 may support a proprietary bus protocol.

Cache memories 1010a-1010h (collectively, cache memories 1010) may store instructions and data for one or more of cores 1001. Cores 1001 may look for data in cache 1010 before reading the data from main memory 1030. A cache hit may occur when a core 1001 finds the data it requested resident in the cache 1010. Cache memories 1010 may include multiple levels, where lower level caches may be smaller and have lower hit rates, but provide faster memory accesses. Higher-level caches may have higher hit rates, but also have more latency when responding to a data request. Each cache memory 1010a-1010b may be organized into a plurality of banks, denoted as Bnk0-Bnkn in FIG. 10. One or more banks may be assigned to a given processor 1001. In some embodiments the assignment may be temporary and in other embodiments, the assignment may be fixed.

Main memory 1030 may store instructions and data for some or all of cores 1001. Main memory 1030 may include both volatile and non-volatile memory, such as Dynamic RAM (DRAM), Static RAM (SRAM), flash, and a hard-disk drive (HDD), for example. In other embodiments, main memory 1030 may include only volatile memory and non-volatile memory may be coupled through another interface. In various embodiments, main memory 1030 may be a memory controller coupled to one or more memory devices.

A multi-source and multi-destination communication network, such as shown in FIG. 1, may be used in computer system 1000. A network, such as, e.g., system 100, may be utilized to couple a plurality of cores 1001 to various cache banks of cache memories 1010. For example, in an embodiment, cores 1001a-1001d may correspond to source nodes 101-104, while banks 0-3 of cache memory 1010a may correspond to destination nodes 105-108. In such an embodiment, cores 1001 may include a local L1 cache and cache memories 1010 may correspond to L2 cache. In response to an L1 cache miss by, for example, core 1001b, core 1001b sends a request to cache 1010a bank 2 for the missed memory data, using the network of system 100, separate from CPU bus 1005. A second network, similar to system 100, may be utilized for the cache banks 0-3 to return the requested data to cores 1001. In the second network, banks 0-3 of cache memory 1010a may correspond to source nodes 101-104 and cores 1001a-1001d may correspond to destination nodes 105-108. Such networks may, in some embodiments, provide a faster access path for cores 1001 to request and receive the missed data from cache memories 1010.

It is noted that the embodiment illustrated in FIG. 10 is merely an example. In other embodiments, additional circuit blocks and different configurations of circuit blocks may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of access units, each access unit of the plurality of access units coupled to at least one other access unit of the plurality of access units, wherein a particular access unit of the plurality of access units is configured to transfer a data transaction to a coupled access unit of the plurality of access units in response to a transfer signal;
   a plurality of circuit nodes each coupled to a respective one of the plurality of access units; and
   a plurality of data processing nodes each coupled to a respective access unit of the plurality of access units, and each data processing node coupled to at least one other data processing node of the plurality of data processing nodes via a physical connection configured to transmit a respective halt indicator signal, wherein a particular data processing node is configured to:
      generate a plurality of data transactions, wherein a destination of a particular data transaction of the plurality of data transactions is a particular circuit node of the plurality of circuit nodes;
      determine an availability of the respective access unit coupled to the particular data processing node;
      in response to a determination that the respective access unit is unavailable, halt a transfer of the plurality of data transactions to the respective access unit and assert at least one respective halt indicator signal; and
      in response to a determination that the respective access unit is available, transfer the particular data transaction to the respective access unit.

2. The system of claim 1, wherein the particular data processing node is further configured to increment at least one count value in response to the determination that the respective access unit is unavailable.

3. The system of claim 1, wherein the particular circuit node is configured to retrieve the particular data transaction in response to a determination that the destination of the particular data transaction corresponds to an identification value of the particular circuit node.

4. The system of claim 1, wherein the particular data processing node is further configured to decrement at least one count value in response to detecting an asserted halt indicator signal from an adjacent data processing node of the plurality of data processing nodes.

5. The system of claim 4, wherein the particular data processing node is further configured to halt the transfer of the plurality of data transactions in response to a determination that the at least one count value satisfies a threshold value.

6. The system of claim 1, wherein the particular data processing node includes a queue, and wherein to transfer the particular data transaction to the respective access unit, the particular data processing node is further configured to store the particular data transaction in the queue.

7. The system of claim 1, wherein, in response to the particular data processing node halting the transfer of the plurality of data transactions to the respective access unit, the respective access unit is configured to continue to transfer a data transaction to an adjacent access unit.

8. A method, comprising:
   generating, by a data processing node, a plurality of data transactions, wherein a destination of a first data transaction of the plurality of data transactions is a particular circuit node of a plurality of circuit nodes;
   determining, by the data processing node, an availability of an access unit coupled to the data processing node;
   in response to determining that the access unit is available, transferring the first data transaction to the access unit; and
   in response to determining that the access unit is unavailable:
      halting a transfer of remaining data transactions of the plurality of data transactions to the access unit; and
      transmitting a halt indicator signal via a physical connection between the data processing node and a different data processing node that is coupled to a different access unit.

9. The method of claim 8, further comprising transferring, by the access unit, the first data transaction to a next access unit in a plurality of access units in response to a transfer signal, wherein each access unit of the plurality of access units is coupled to at least one other access unit of the plurality of access units.

10. The method of claim 8, further comprising incrementing a count value in response to determining that the access unit is unavailable.

11. The method of claim 8, further comprising retrieving, by the particular circuit node, the first data transaction in response to determining that the destination of the first data transaction corresponds to an identification value of the particular circuit node.

12. The method of claim 8, further comprising decrementing, by the data processing node, at least one count value in response to detecting an asserted halt indicator signal from an adjacent data processing node.

13. The method of claim 12, further comprising halting, by the data processing node, the transfer of remaining data transactions of the plurality of data transactions to the access unit in response to determining that the at least one count value satisfies a threshold value.

14. The method of claim 8, further comprising continuing to transfer, by the access unit, a data transaction to an adjacent access unit in response to halting the transfer of the remaining data transactions to the access unit.

15. An apparatus, comprising:
    a logic node configured to generate a plurality of data transactions, wherein a destination of a particular data transaction of the plurality of data transactions is a particular circuit node;
    a queue coupled to an access unit; and
    an access interface configured to:
       store a next data transaction of the plurality of data transactions in the queue in response to a determination that the queue has available storage space; and
       in response to a determination that the queue is full:
          halt storage of the plurality of data transactions; and
          assert at least one halt indicator signal on a physical connection between the access interface and a different access interface.

16. The apparatus of claim 15, wherein the access interface is further configured to transfer an oldest data transaction in the queue into the access unit in response to a determination that the access unit is available.

17. The apparatus of claim 15, further comprising one or more counter circuits, wherein the access interface is further configured to increment the one or more counter circuits in response to a determination that the queue is full.

18. The apparatus of claim 17, wherein each of the one or more counter circuits is coupled to a respective halt signal.

19. The apparatus of claim 18, wherein each of the one or more counter circuits is configured to decrement in response to an assertion of the respective halt indicator signal.

20. The apparatus of claim 19, wherein the access interface is further configured to:
compare respective values of the one or more counter circuits to a threshold value; and
halt storage of the plurality of data transactions based on a result of the comparison.

21. A system, comprising:
a plurality of access units, each access unit of the plurality of access units coupled to at least one other access unit of the plurality of access units, wherein a particular access unit of the plurality of access units is configured to transfer a data transaction to a coupled access unit in response to a transfer signal;
a plurality of circuit nodes each coupled to a respective one of the plurality of access units; and
a plurality of data processing nodes each coupled to a respective access unit of the plurality of access units, wherein a particular data processing node is configured to transfer a data transaction to the particular access unit, wherein a destination of the data transaction is a particular circuit node of a plurality of circuit nodes;
wherein the particular access unit is further configured to:
reject the transfer of the data transaction from the particular data processing node in response to a determination that the particular access unit is unavailable;
increment a count value in response to the rejection of the transfer of the data transaction; and
assert a stall request signal to a different access unit of the plurality of access units in response to a determination that the count value has satisfied a threshold; and
wherein the different access unit is configured to halt transfer of data transactions from another data processing node of the plurality of data processing nodes in response to detecting the asserted stall request signal.

22. The system of claim 21, wherein the different access unit is further configured to assert an acknowledge signal to an intermediate access unit coupled between the different access unit and the particular access unit in response to halting the transfer of data transactions from the different data processing node.

23. The system of claim 22, wherein the intermediate access unit is configured to refuse transfer of data transactions from a coupled data processing node in response to the assertion of the acknowledge signal.

24. The system of claim 21, wherein the particular access unit includes a counter circuit, and wherein to increment the count value in response to the rejection of the transfer of the data transaction from the particular data processing node, the particular access unit is further configured to increment a count value of the counter circuit.

* * * * *